United States Patent [19]

Maezawa et al.

[11] Patent Number: 5,023,222

[45] Date of Patent: Jun. 11, 1991

[54] CATALYST FOR PRODUCING SYNDIOTACTIC CONFIGURATION STYRENE-BASED POLYMERS

[75] Inventors: Hiroshi Maezawa; Norio Tomotsu; Masahiko Kuramoto, all of Ichihara, Japan

[73] Assignee: Idemitsu Kosan Company Limited, Tokyo, Japan

[21] Appl. No.: 591,417

[22] Filed: Oct. 1, 1990

Related U.S. Application Data

[62] Division of Ser. No. 274,022, Nov. 21, 1988, Pat. No. 4,978,730.

[30] Foreign Application Priority Data

Dec. 24, 1987 [JP] Japan ................................. 62-325391
Jan. 19, 1988 [JP] Japan ................................. 63-007465
Jan. 19, 1988 [JP] Japan ................................. 63-007466
Feb. 13, 1988 [JP] Japan ................................. 63-030048
Mar. 19, 1988 [JP] Japan ................................. 63-066908
Mar. 19, 1988 [JP] Japan ................................. 63-066910

[51] Int. Cl.$^5$ ............................................. C08F 4/642
[52] U.S. Cl. ................................... 502/103; 502/110; 502/111; 526/153
[58] Field of Search ......................... 502/103, 110, 111

[56] References Cited

U.S. PATENT DOCUMENTS 3,534,006 10/1970 Kamaishi et al. ............... 502/103 X
4,680,353 7/1987 Ishihara et al. .................. 526/159 X

FOREIGN PATENT DOCUMENTS 0210615 2/1987 European Pat. Off. .

Primary Examiner—Patrick P. Garvin
Attorney, Agent, or Firm—Frishauf, Holtz, Goodman & Woodward

[57] ABSTRACT

A catalyst for producing styrene-based polymers having mainly syndiotactic configuration which comprises (A) a titanium compound and (B) a contact product of a methyl group-containing organoaluminum compound and water, wherein the contact product (B) has a high magnetic field component of not more than 50% in the methyl proton signal region due to an aluminum-methyl group (Al-CH$_3$) bond as determined by the proton nuclear magnetic resonance absorption method.

8 Claims, No Drawings

CATALYST FOR PRODUCING SYNDIOTACTIC CONFIGURATION STYRENE-BASED POLYMERS

This is a division of application Ser. No. 07/274,022 filed Nov. 21, 1988 and now U.S. Pat. No. 4,978,730.

BACKGROUND OF THE INVENTION

1. Field of the Invention

The present invention relates to a process for producing styrene-based polymers and catalysts for use therein. More particularly, it is concerned with a process for efficiently producing styrene-based polymers having mainly syndiotactic configuration and catalysts for used therein.

2. Description of the Related Art

Styrene-based polymers having a syndiotactic configuration, particularly those with high syndiotactic configuration, have not been known although those having an atactic or isotactic configuration are known.

The present inventors' group has succeeded in developing styrene-based polymers having stereostructure that is mainly syndiotactic (Japanese Patent Application Laid-Open Nos. 104818/1987 and 187708/1987).

The catalysts to be used in production of the above styrene-based polymers having mainly syndiotactic configuration are not only expensive but also have insufficient activity.

Thus the present inventors made expensive investigations to develop a process whereby styrene-based polymers having syndiotactic configuration can be produced more efficiently.

SUMMARY OF THE INVENTION

An object of the present invention is to provide a process for efficiently producing styrene-based polymers with high syndiotacticity.

Another object of the present invention is to provide an economically advantageous process for producing styrene-based polymers having syndiotactic configuration.

Still another object of the present invention is to provide a catalyst suitable for efficiently producing styrene-based polymers with high syndiotacticity.

The present invention relates to a process for producing styrene-based polymers having mainly syndiotactic configuration by the use of a catalyst comprising (A) a titanium compound and (B) a contact product (reaction product) of a methyl group-containing organoaluminum compound (an organoaluminum compound containing methyl group) and water; which process is characterized in that the contact product (B) has a high magnetic field component of not more than 50% in a methyl proton signal region due to an aluminum-methyl group (Al-CH$_3$) bond as determined by the proton nuclear magnetic resonance absorption method.

The present invention further relates to a catalyst for producing styrene-based polymers, containing the above components (A) and (B) as main components.

DESCRIPTION OF PREFERRED EMBODIMENTS

The process of the present invention is carried out in the presence of a catalyst containing (A) a titanium compound and (B) a contact product of a methyl group-containing organoaluminum compound and water as main components.

Various titanium compounds can be used as component (A). An example of the titanium compounds is at least one compound selected from the group consisting of titanium compounds and titanium chelate compounds represented by formula (I) or (II):

$$\text{TiR}^1{}_a\text{R}^2{}_b\text{R}^3{}_c\text{R}^4{}_{4-(a+b+c)} \quad (I)$$

$$\text{TiR}^1{}_d\text{R}^2{}_e\text{R}^3{}_{3-(d+e)} \quad (II)$$

(wherein $R^1$, $R^2$, $R^3$ and $R^4$ represent independently a hydrogen atom, an alkyl group having 1 to 20 carbon atoms, an alkoxy group having 1 to 20 carbon atoms, an aryl group, an alkylaryl group, an aryl alkyl group and an aryloxy group each having 6 to 20 carbon atoms, an acyloxy group having 1 to 20 carbon atoms, a cyclopentadienyl group, a substituted cyclopentadienyl group, an indenyl group or a halogen atom; a, b and c are independently an integer of 0 to 4, and d and e are independently an integer of 0 to 3).

$R^1$, $R^2$, $R^3$ and $R^4$ in general formula (I) or (II) independently a hydrogen atom, an alkyl group having 1 to 20 carbon atoms (e.g., a methyl group, an ethyl group, a propyl group, a butyl group, an amyl group, an isoamyl group, an isobutyl group, an octyl group, or a 2-ethylhexyl group), an alkoxy group having 1 to 20 carbon atoms (e.g., a methoxy group, an ethoxy group, a propoxy group, a butoxy group, an amyloxy group, a hexyloxy group, or a 2-ethylhexyloxy group), an aryl group, an alkylaryl group, an arylalkyl group and an aryloxy group each having 6 to 20 carbon atoms (e.g., a phenyl group, a tolyl group, a xylyl group, a benzyl group, or a phenoxy group), an acyloxy group having 1 to 20 carbon atoms (e.g., a heptadecylcarbonyloxy group), a cyclopentadienyl group, a substituted cyclopentadienyl group (e.g., a methylcyclopentadienyl group, a 1,2-dimethylcyclopentadienyl group, or a pentamethylcyclopentadienyl group), an indenyl group, or a halogen atom (e.g., chlorine, bromine, iodine or fluorine). $R^1$, $R^2$, $R^3$ and $R^4$ may be the same or different.

Specific examples of tetravalent titanium compounds and titanium chelate compounds represented by general formula (I) are; methyltitanium trichloride, titanium tetramethoxide, titanium tetraethoxide, titanium isopropoxytrichloride, titanium diisopropoxydichloride, titanium triisopropoxymonochloride, tetra(2-ethylhexyloxy)titanium, cyclopentadienyltitanium trichloride, biscyclopentadienyltitanium dichloride, cyclopentadienyltitanium trimethoxide, cyclopentadienyltrimethyltitanium, pentamethylcyclopentadienyltitanium trimethoxide, pentamethylcyclopentadienyltrimethyltitanium, titanium tetrachloride, titanium tetrabromide, bis(2,4-pentanedionate)titanium oxide, bis(2,4-pentanedienate)titanium dichloride, and bis(2,4-pentanedionate)titanium dibutoxide. Other examples in which one of $R^1$, $R^2$, $R^3$ and $R^4$ is a cyclopentadienyl group, a substituted cyclopentadienyl group or an indenyl group are cyclopentadienyltitanium trimethyl, cyclopentadienyltitanium tributyl, pentamethylcyclopentadienyltitanium trimethyl, pentamethylcyclopentadienyltitanium triethyl, pentamethylcyclopentadienyltitanium tripropyl, pentamethylcyclopentadienyltitanium tributyl, cyclopentadienyltitanium methyldichloride, cyclopentadienyltitanium ethyldichloride, pentamethylcyclopentadienyltitanium methyldichloride, pentamethylcyclopentadienyltitanium ethyldichloride, cyclopentadienyltitanium dimethylmonochloride, cyclopentadienyltitanium diethylmonochloride, cyclopentadienyltitanium trimethoxide, cyclopentadienyltitanium triethoxide, cyclopentadienyltitanium triisopropoxide, pentamethylcyclopentadienyltitanium trimethoxide, pentamethylcyclopentadienyltitanium triethoxide, pentamethylcyclopentadienyltitanium triisopropoxide, pentamethylcyclopentadienyltitanium trichloride, cyclopentadienyltitanium monomethoxydichloride, cyclopentadienyltitanium dimethoxymonochloride, pentamethylcyclopentadienyltitanium monomethoxydichloride, cyclopentadienyltitanium triphenoxide, cyclopentadienyltitanium diphenoxymonochloride, cyclopentadienyltitanium monophenoxydichloride, cyclopentadienyltitanium tribenzyl, cyclopentadienyltitanium methyldibenzyl, pentamethylcyclopentadienyltitanium tribenzyl, pentamethylcyclopentadienyltitanium diethoxymethyl, indenyltitanium trichloride, indenyltitanium triumethoxide, indenyltitanium triethoxide, indeyltitanium trimethyl, and indenyltitanium tribenzyl. In addition, as the titanium compound of component (A), condensed titanium compounds represented by the general formula (III):

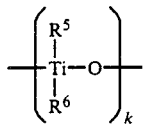
(III)

(wherein $R^5$ and $R^6$ represent independently a halogen atom, an alkoxy group having 1 to 20 carbon atoms, or an acyloxy group having 1 to 20 carbon atoms, and k is 2 to 20) may by used.

The above titanium compounds may be used in the form of complexes with esters, ethers and the like.

Typical examples of the trivalent titanium compound represented by the general formula (II) as component (A) are titanium trihalides such as titanium trichloride, and cyclopentadienyltitanium compounds such as cyclopentadienyltitanium dichloride. In addition, those obtained by reducing tetravalent titanium compounds can be used. These trivalent titanium compounds may be used in the form of complexes with esters, ethers and the like.

Component (B) of the catalyst to be used in the present invention is a contact product of a methyl group-containing organoaluminum compound and water. This contact product is usually obtained by contacting or reacting a methyl group-containing organoaluminum compound with water. As the methyl group-containing organoaluminum compound, trialkylaluminum represented by the general formula:

$$AlCH_3R'_2 \quad (IV)$$

(wherein R' is an alkyl group having 1 to 8 carbon atoms) is usually used. Specific examples of the trialkylaluminum are trimethylaluminum, methyldiethylaluminum, dimethylethylauminum, methyldiisobutylaluminum, and dimethylisobutylaluminum. Of these compounds, trimethylaluminum is most preferred.

As the water to be condensed with the organoaluminum compound, the normal water and ice, or various water-containing compounds, e.g., solvents containing water, inorganic compounds containing water adsorbed thereon, and metal salts containing water of crystallization, such as $CuSO_4 \cdot 5H_2O$ can be used.

The contact product (reaction product) of the methyl group-containing organoaluminum compound and water includes various products, although they are not always identified. For example, when the methyl group-containing organoaluminum compound is trimethylaluminum, the contact product contains chain-like methylaluminoxane represented by the general formula:

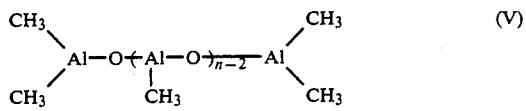
(V)

(wherein n is an integer of 2 to 50), and cyclic methylaluminoxane having a repeating unit represented by the general formula:

(VI)

(degree of polymerization: 2 to 52).

In general, the contact product of the organoaluminum compound (e.g., trialkylaluminum) and water contains various compounds, the type of which varies depending on contacting conditions. For example, when the organoaluminum compound is trialkylaluminum, the contact product is a mixture of the aforementioned chain-like alkylaluminoxane (e.g., chain-like methylaluminoxane) and cyclic alkylaluminoxane (e.g., cyclic methylaluminoxane), unreacted trialkylaluminum, and other condensates, or a molecule resulting from association in a complicated manner of the above mixture. Preferred as component (B) is a contact product of trialkylaluminum (preferably trimethylaluminum) and water in which the area of the high magnetic field component in the methyl proton signal region due to the aluminum-methyl group (Al-CH$_3$) bond as observed by the proton nuclear magnetic resonance method is not more than 50% of the total signal area.

In a proton nuclear magnetic resonance ($^1$H-NMR) spectral analysis of a solution of the contact product in toluene at room temperature, the methyl proton signal due to Al-CH$_3$ is observed in the region of 1.0 to $-0.5$ ppm (tetramethylsilane (TMS) standard). Since the proton signal of TMS (0 ppm) is in the 1.0 to $-0.5$ ppm region of the methyl proton signal due to Al-CH$_3$, the contact product is measured with toluene as the solvent as the standard. The methyl proton signal due to Al-CH$_3$ is divided into two components: the high magnetic field component in the $-0.1$ to $-0.5$ ppm region and the other magnetic field component in the 1.0 to $-0.1$ ppm region. In contact products preferably used as component (B), the area of the high magnetic field component is not more than 50%, preferably 45 to 5% of the total signal area in the 1.0 to $-0.5$ ppm region.

If the high magnetic field component is more than 50%, the resulting catalyst has insufficient activity and thus styrene-based polymers having syndiotactic configuration cannot be produced efficiently.

There are no special limitations to methods of preparing the contact product of the methyl group-containing organoaluminum compound and water; that is, the contact product can be obtained by known methods. For example, (1) a method in which the methyl group-containing organoaluminum compound is dissolved in an organic solvent and then contacted with water, (2) a method in which the methyl group-containing organoaluminum compound is first added at the time of polymerization and, thereafter, water is added, and (3) a method in which the methyl group-containing organoaluminum compound is contacted with water of crystallization contained in metal salts and the like, or with water absorbed in inorganic or organic compounds can be employed. The above water may contain up to about 20% by weight ammonia, amines such as ethylamine, sulfur compounds (e.g., hydrogen sulfide), phosphorus compounds (e.g., phosphorous acid esters), and the like.

Contacting conditions for making the high magnetic field component not more than 50% are varied and cannot be always specified. In general, the contact reaction is preferably carried out under such conditions that (1) the contact reaction temperature is raised (specifically about 40° to 80° C.), (2) the ratio of water to the methyl group-containing organoaluminum compound is increased (specifically, water/methyl group-containing organoaluminum compound=1.2/1 to 5/1 (molar ratio)), and (3) heat treatment is carried out after the contact reaction.

In preparation of the above contact product, the aforementioned organoaluminum compound is used. Particularly in the case of trimethylaluminum, it may be used in combination with branched alkylaluminum represented by the general formula: $AlR_3$ (wherein R, which may be identical or different, is a branched alkyl group having 3 to 10 carbon atoms). In the above formula, R is a branched alkyl group having 3 to 10 carbon atoms, e.g., an isopropyl group, an isobutyl group, a sec-butyl group, a tert-butyl group, an isopentyl group, a neopentyl group, a 2-methylpenthyl group, a 2-methylhexyl group, and a 2-ethylhexyl group. Specific examples of the tribranched alkylaluminum are triisopropylaluminum, triisobutylaluminum, tri-tert-butylaluminum, triisopentylaluminum, tri(2-methylpentyl) aluminum, tri(2-methylhexyl)aluminum, tri(2-ethylhexyl) aluminum and the like. Of these compounds, triisobutylaluminum is preferred.

In preparation of the contact product as component (B), trimethylaluminum and the above tri-branched alkylaluminum can be used in varied ratios when they are used in combination. In general, the molar ratio of trimethylaluminum to tri-branched alkylaluminum is 99.9:0.1 to 50:50 and preferably 98:2 to 72:25.

The contact product as component (B) has varied molecular weight. Any contact product can be used in the process of the present invention. Of these contact products, those having a molecular weight of 400 to 3,000, preferably 500 to 2200, most preferably 600 to 1800 as determined by the freezing point depression method using benzene as a solvent, are used.

The above contact product, when used as such as component (B) of the catalyst, exhibits sufficiently high activity. Heat treatment after the contact reaction between the organoaluminum compound and water further increased the catalytic activity. More specifically, after the contact reaction between the organoaluminum compound and water, a solid residue (e.g., water-containing compounds) is filtered off and the filtrate is heated under atmospheric pressure or reduced pressure at a temperature of 30° to 200° C., preferably 40° to 170° C., most preferably 70° to 150° C. for 20 minutes to 8 hours, preferably 0.5 to 5 hours. In heat treatment, the temperature is usually chosen appropriately within the range stated above. If the temperature is less than 30° C., insufficient improvement due to heat results. On the other hand, if it is more than 200° C., undesirable heat decomposition of the contact product itself occurs.

Depending on heat treating conditions, the contact product obtained is colorless solid or solution. The product thus obtained is, if necessary, dissolved in or diluted with a hydrocarbon solvent and can be used as a catalyst solution.

The catalyst of the present invention contains the above components (A) and (B) as main components. If necessary, the catalyst may further contain other catalyst components, e.g., other organometallic compounds. The ration of component (A) to component (B) in the catalyst is varied and cannot be determined unconditionally. The ratio of aluminum contained component (B) to titanium contained in component (A), i.e., aluminum/titanium (molar ratio) is 1:1 to $1 \times 10^6$:1 and preferably 10:1 to $1 \times 10^4$:1.

In the present invention, along with components (A) and (B), an organoaluminum compound (C) can be used as a main component of the catalyst.

As component (C), various organoaluminum compounds can be used. More specifically, organoaluminum compounds represented by the general formula:

$$R^7{}_kAl(OR^8)_mH_pX^2{}_q \qquad (VII)$$

(wherein $R^7$ and $R^8$ are independently an alkyl group having 1 to 8 carbon atoms, preferably 1 to 4 carbon atoms, $X^2$ is a halogen atom, k is $0 < k \leq 3$, m is $0 < m \leq 3$, p is $0 \leq p < 3$, q is $0 \leq q < 3$, and $k+m+p+q=3$) can be used.

Examples of the organoaluminum compound represented by the general formula (VII) are shown below.
p=q=0

Compounds represented by the general formula:

$$R^7{}_kAl(OR^8)_{3-k}$$

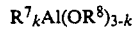

(wherein $R^7$ and $R^8$ are the same as above, and k is preferably a number of $1.5 \leq k < 3$). m=p=0

Compounds represented by the general formula:
$$R^7{}_kAlX^2{}_{3-k}$$

(wherein $R^7$ and $X^1$ are the some as above, and k is preferably $0 < k < 3$). m=q=0

Compounds represented by the general formula:

$$R^7{}_kAlH_{3-k}$$

(wherein $R^7$ is the same as above, and k is preferably $2 \leq k < 3$). p=0

Compounds represented by the general formula:

$$R^7{}_kAl(OR^8)_mX^2{}_q$$

(wherein $R^7$, $R^8$ and $X^2$ are the same as above, and $0 < k \leq 3$, $0 \leq m < 3$, $0 \leq q < 3$ and $k+m+q=3$). p=q=0, k=3

Trialkylaluminum such as triethylaluminum and tributylaluminum. Of these, triethylaluminum, tri-n-butylaluminum and triisobutylaluminum are preferred.
p=q=0, $1.5 \leq k < 3$ Dialkylaluminumalkoxide such as diethylaluminum ethoxide and dibutylaluminum butoxide, alkylaluminum sesquialkoxide such as ethylaluminum sesquiethoxide and butylaluminum sesquibutoxide, and partially alkoxylated alkylaluminum having an average composition represented by the formula: $R^7_{2.5}Al(OR^8)_{0.5}$, for example. $m=p=0$ Partially halogenated alkylaluminum, e.g., dialkylaluminum halogenide ($k=2$), such as diethylaluminum chloride, dibutylaluminum chloride and diethylaluminum bromide, alkylaluminum sesquihalogenide ($k=1.5$), such as ethylaluminum sesquichloride, butylaluminum sesquichloride and ethylaluminum sesquihalogenide, and alkylaluminum dihalogenide ($k=1$), such as ethylaluminum dichloride, propylaluminum dichloride and butylaluminum dibromide. $m=q=0$ Partially hydrogenated alkylaluminum, e.g., dialkylaluminum hydride ($k=2$), such as diethylalumnum hydride and dibutylaluminum hydride, and alkylaluminum dihydride ($m=k$), such as ethylaluminum dihydride and propylaluminum dihydride. $p=0$ Partially alkoxylated and halogenated alkylaluminum, e.g., ethylaluminum ethoxychloride, butylaluminum butoxychloride and ethylaluminum ethoxybromide ($k=m=q=1$).

The catalyst of the present invention contains the above components (A), (B) and (C) as main components. If necessary, the catalyst may contain other catalyst components.

The ratio of component (A), component (B) and component (C) in the catalyst is varied and cannot be determined unconditionally. The ratio of aluminum contained in components (B) and (C) to titanium contained in component (A), i.e., aluminum/titanium (molar ratio) is 1:1 to $1:1\times 10^4$ and preferably 10:1 to $1\times 10^3:1$.

The catalyst of the present invention is highly active in producing styrene-based polymers having mainly syndiotactic configuration.

In accordance with the process of the present invention, styrene-based monomers such as styrene and/or styrene derivatives (e.g., alkylstyrene, alkoxystyrene, halogeneted styrene, and vinyl benzoate) are polymerized or copolymerized in the presence of a catalyst containing components (A) and (B), or components (A), (B) and (C) as main components to produce styrene-based polymers. This polymerization may be bulk polymerization or may be carried out in a solvent, e.g., aliphatic hydrocarbon such as pentane, hexane and heptane, or aromatic hydrocarbon such as benzene, toluene and xylene. The polymerization temperature is not critical, and it is usually $-30°$ to $120°$ C. and preferably $-10°$ to $100°$ C.

Styrene-based polymers produced by the above process have mainly syndiotactic configuration. The styrene-based polymers having mainly syndiotactic configuration mean styrene-based polymers having a stereostructure that is mainly syndiotactic, i.e., a stereostructure in which phenyl groups or substituted phenyl groups as side chains are located alternately at opposite positions relative to the main chain composed of carbon-carbon bonds. The tacticity is quantitatively determined by the nuclear magnetic resonance method using carbon isotope ($^{13}$C-NMR method). The tacticity determined by the $^{13}$C-NMR method is indicated in terms of proportions of structural units continuously connected to each other, i.e., diad in which two structural units are connected to each other, triad in which three structural units are connected to each other, and pentad in which five structural units are connected to each other. The styrene-based polymers having mainly syndiotactic configuration of the present invention includes polystyrene, poly(alkylstyrene), poly(halogenated styrene), poly(alkoxystyrene), polyvinyl benzoate, or mixtures thereof and copolymers containing the above monomers as main components, each having such a syndiotactic structure that the proportion of diad is at least 75% and preferably at least 85%, or the proportion of pentad (racemi pentad) is at least 30% and preferably at least 50%.

The poly(alkylstyrene) includes polymethylstyrene, polyethylstyrene, polyisopropylstyrene, and poly(tert-butylstyrene). The poly(halogenated styrene) includes polychlorostyrene, polybromostyrene, and polyfluorostyrene. The poly(alkoxystyrene) includes polymethoxystyrene and polyethoxystyrene. Particularly preferred among the above polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.

The styrene-based polymers produced according to the process of the present invention have a weight average molecular weight of at least 5,000 and preferably 10,000 to 20,000,000 and a number average molecular weight of at least 2,500 and preferably 5,000 to 10,000,000.

The styrene-based polymers produced by the process of the present invention have sufficiently high syndiotacticity. If de-ashing treatment using a washing solution containing hydrochloric acid and the like is applied after polymerization, washing treatment is further applied using a solvent (e.g., methyl ethyl ketone) after the process of washing and drying in vacuum to remove a soluble portion, and the insoluble portion is treated with, for example, chloroform, styrene-based polymers having a much higher syndiotacticity can be obtained efficiently.

By controlling the catalyst components, the molecular weight of the styrene-based polymer can be controlled within the desired range.

Heat treatment of the contact product as component (B) further increases the catalytic activity and thus the desired styrene-based polymers can be produced even more increased efficiently.

Styrene-based polymers having syndiotactic configuration are excellent in physical properties such as heat resistance and chemical resistance, and thus can be widely used in various applications.

The present invention is described in greater detail with reference to the following examples.

EXAMPLE 1

(1) Preparation of Contact Product of Trimethylaluminum and Water

In a 500-milliliter glass vessel which had been purged with argon were placed 200 ml of toluene, 17.8 g (71 mmol) of copper sulfate pentahydrate ($CuSO_4 \cdot 5H_2O$) and 24 ml (250 mmol) of trimethylaluminum, which were then reacted at 40° C. for 8 hours. Then, solids were separated from the reaction mixture, and the toluene was distilled away from the solution as obtained above under reduced pressure at room temperature to obtain 6.7 g of a contact product. The molecular weight of the contact product as determined by the freezing point depression method was 610. The high magnetic field component (i.e., $-0.1$ to $-0.5$ ppm) as determined by the $^1$H-NMR method was 43%.

(2) Production of Styrene-Based Polymer

In a 500-milliliter reactor were placed 100 ml of toluene, 15 mmol as aluminum atom of the contact product obtained in (1) above, 0.025 mmol of cyclopentadienyltitanium trichloride and 150 mmol of styrene, and polymerization was performed at 50° C. for one hour. After the polymerization, the product was washed with a mixture of hydrochloric acid and methanol to decompose the catalyst components (i.e., the contact product and cyclopentadienyltitanium trichloride) and then dried to obtain 5.0 g of syndiotactic polystyrene (syndiotacticity in racemi pentad: 98%) (yield: 32.1%).

EXAMPLE 2

(1) Preparation of Contact Product of Trimethylaluminum and Water

The procedure of Example 1 (1) was repeated with the exception that the reaction time was changed to 24 hours, to obtain 6.2 g of a contact product having a molecular weight of 750 and a high magnetic component of 41%.

(2) Production of Styrene-Based Polymer

The procedure of Example 1 (2) was repeated with the exception that the contact product obtained in (1) above was used, to obtain 6.6 g of syndiotactic polystyrene (syndiotacticity in recemi pentad: 98%) (yield: 42.2%).

EXAMPLE 3

(1) Preparation of Contract Product of Trimethylaluminum and Water

The procedure of Example 1 (1) was repeated with the exception that 22.9 g (91 mmol) of copper sulfate pentahydrate ($CuSO_4.5H_2O$) and 100 ml of toluene were used, and the reaction time was changed to 24 hours, to obtain 7.0 g of a contact product having a molecular weight of 1,000 and a high magnetic field component of 33%.

(2) Production of Styrene-Based Polymer

The procedure of Example 1 (2) was repeated with the exception that the contact product obtained in (1) above was used, to obtain 7.4 g of syndiotactic polystyrene (syndiotacticity in racemi pentad: 98%) (yield: 47.4%).

EXAMPLE 4

(1) Preparation of Contact Product of Trimethylaluminum and Water

The procedure of Example 1 (1) was repeated with the exception that 25.2 g (100 mmol) of copper sulfate pentahydrate ($CuSO_4.5H_2O$) was used and the reaction time was changed to 15 hours, to obtain 6.5 g of a contact product having a molecular weight of 850 and a high magnetic field component of 28%.

(2) Production of Styrene-Based Polymer

The procedure of Example 1 (2) was repeated with the exception that the contact product obtained in (1) above was used, to obtain 11.0 g of syndiotactic polystyrene (syndiotacticity in racemi pentad: 98%) (yield: 70.5%).

COMPARATIVE EXAMPLE 1

(1) Preparation of Contact Product of Trimethylaluminum and Water

The procedure of Example 1 (1) was repeated with the exception that 34.6 ml (360 mmol) of trimethylaluminum and 29.4 g (117 mmol) of copper sulfate pentahydrate ($CuSO_4.5H_2O$) were used, and the reaction time was changed to 3 hours, to obtain 3.2 g of a contact product having a molecular weight of 470 and a high magnetic field component of 65%.

(2) Production of Styrene-Based Polymer

The procedure of Example 1 (2) was repeated with the exception that the contact product obtained in (1) above was used. In this case, only 0.01 g of syndiotactic polystyrene (syndiotacticity in racemi pentad: 96%) was obtained (yield: 0.1%).

EXAMPLE 5

In a 500-milliliter reactor were placed 200 ml of heptane, 8 mmol as aluminum atom of the contact product obtained in Example 1 (1), 0.08 mmol of pentamethylcyclopentadienyltitanium trimethoxide and 50 ml of styrene, and polymerization was performed at 50° C. for 2 hours. After the polymerization, the product was washed with a mixture of hydrochloric acid and methanol mixture to decompose the catalyst components and then dried to obtain 25.0 g of a polymer. This polymer was extracted with methyl ethyl ketone by the use of a Soxhlet extractor to obtain a methyl ethyl ketone-insoluble portion (MIP) of 98.0%. The polymer thus obtained had a weight average molecular weight of 1,600,000 and a number average molecular weight of 662,000. From the melting point and the results of the $^{13}C$-NMR analysis, it was confirmed that the polymer was polystyrene having syndiotactic configuration.

EXAMPLE 6

The procedure of Example 5 was repeated with the exception that pentamethylcyclopentadienyltitanium triethoxide was used in place of the pentamethylcyclopentadienyltitanium trimethoxide, to obtain syndiotactic polystyrene having a weight average molecular weight of 1,620,000 in a conversion of 44.7%.

EXAMPLE 7

The procedure of Example 5 was repeated with the exception that pentamethylcyclopentadienyltitanium di-tert-butoxy monochloride was used in place of the pentamethylcyclopentadienyltitanium trimethoxide, to obtain syndiotactic polystyrene having a weight average molecular weight of 1,480,000 in a conversion of 16.9%.

EXAMPLE 8

The procedure of Example 5 was repeated with the exception that the contact product obtained in Example 2 (1) was used and cyclopentadienyltitanium trimethoxide was used in place of the pentamethylcyclopentadienyltitanium trimethoxide, to obtain syndiotactic polystyrene having a weight average molecular weight of 128,000 in a conversion of 75.2%.

EXAMPLE 9

Syndiotactic polystyrene was produced in the same manner as in Example 8 except that cyclopentadienyltitanium triethoxide was used in place of the cyclopentadienyltitanium trimethoxide (conversion: 68.6%).

EXAMPLE 10

Syndiotactic polystyrene was produced in the same manner as in Example 8 except that cyclopentadienyltitanium triphenoxide was used in place of the cyclopentadienyltitanium trimethoxide (conversion: 60.3%).

COMPARATIVE EXAMPLE 2

The procedure of Example 5 was repeated with the exception that the contact product obtained in Comparative Example 1 (1) was used and titanium tetraethoxide was used in place of the pentamethylcyclopentadienyltitanium trimethoxide. In this case, syndiotactic polystyrene was obtained only in a conversion of 6.6%.

The conversion, yield, methyl ethyl ketone-insoluble portion (MIP) and weight average molecular weight (Mw) of syndiotactic polystyrenes obtained in Examples 5 to 10 and Comparative Example 2 are shown in Table 1.

TABLE 1

| No. | Conversion (%) | Yield (g) | MIP (%) | Mw ($\times 10^4$) |
|---|---|---|---|---|
| Example 5 | 55.0 | 25.0 | 98 | 160 |
| Example 6 | 44.7 | 20.3 | 95 | 162 |
| Example 7 | 16.9 | 7.7 | 96 | 148 |
| Example 8 | 75.2 | 34.2 | 86 | 12.8 |
| Example 9 | 68.6 | 31.2 | 88 | 19.4 |
| Example 10 | 60.3 | 27.4 | 94 | 11.8 |
| Comparative Example 2 | 6.6 | 3.0 | 88.2 | 54.1 |

EXAMPLE 11 TO 14

In a 500-milliliter reactor were placed 200 ml of heptane, 8 mmol as aluminum atom of the contact product obtained in Example 1 (1), 0.08 mmol of a titanium compound as shown in Table 2 and 50 ml of styrene, and polymerization was performed at 50° C. for 2 hours. After the polymerization, the reaction product was washed with a mixture of hydrochloric acid and methanol to decompose the catalyst components and then dried to obtain a polymer. This polymer was extracted with methyl ethyl ketone by the use of a Soxhlet extractor. The methyl ethyl ketone-insoluble portion (MIP) was 98.0%. The polymer had a weight average molecular weight of 1,450,000 and a number average molecular weight of 662,000. From the melting point and the results of the $^{13}$C-NMR analysis, it was confirmed that the polymer was polystyrene having syndiotactic configuration.

The conversion, yield, methyl ethyl ketone-insoluble portion (MIP), weight average molecular weight (Mw) and number average molecular weight (Mn) of polystyrenes obtained in Examples 11 to 14 are shown in Table 2.

merization was performed at 50° C. for 2 hours. After the polymerization, the product was washed with a mixture of hydrochloric acid and methanol to decompose the catalyst components and then dried to obtain 41.2 g of a polymer. This polymer was extracted with trimethyl ethyl ketone by the use of a Soxhlet extractor. The methyl ethyl ketone-insoluble portion (MIP) was 98.0%. The polymer had a weight average molecular weight of 850,000 and a number average molecular weight of 369,000. From the melting point and the results of the $^{13}$C-NMR analysis, it was confirmed that the polymer was polystyrene having syndiotactic configuration.

EXAMPLE 16

Polystyrene having syndiotactic configuration was produced in the same manner as in Example 15 except that 2 mmol of triethylaluminum was used in place of the triisobutylaluminum.

EXAMPLE 17

Polystyrene having syndiotactic configuration was produced in the same manner as in Example 15 except that 2 mmol of monoethoxydiethylaluminum was used in place of the triisobutylaluminum.

The catalyst compositions used and the results of polymerization in Example 15 to 17 are shown in Table 3.

EXAMPLES 18 TO 21

Polystyrene having syndiotactic configuration was produced in the same manner as in Example 15 except that the conditions shown in Table 3 were used. The results are shown in Table 3.

EXAMPLE 22

(1) Preparation of Contact Product of Trimethylaluminum and Water

In 200 ml of toluene as a solvent, 24.0 ml (0.250 mol) of trimethylaluminum and 23.7 g (0.095 mol) of copper sulfate pentahydrate were reacted at 20° C. for 24 hours, and then solids were removed to obtain a toluene solution containing 8.1 g of methylaluminoxane as a contact product. In this contact product, the high magnetic field component (i.e., 0.1 to −0.5 ppm) as determined by the $^1$H-NMR analysis was 48%.

TABLE 2

| No. | Titanium Compound | Conversion (%) | Yield (g) | MIP (%) | Mw | Mn ($\times 10^4$) |
|---|---|---|---|---|---|---|
| Example 11 | Cp*TiMe$_3$ | 90.7 | 41.2 | 98.0 | 145 | 62.2 |
| Example 12 | Cp*TiEt$_3$ | 83.1 | 37.8 | 97.1 | 128 | 52.3 |
| Example 13 | Cp*Ti(n-Bu)$_3$ | 75.2 | 34.8 | 96.9 | 115 | 54.5 |
| Example 14 | Cp*Ti(CH$_2$C$_6$H$_5$)$_3$ | 50.7 | 23.0 | 97.5 | 106 | 42.7 |
| Comparative Example 2 | Ti(OEt)$_4$ | 6.6 | 3.0 | 88.2 | 54.1 | 20.6 |

*Cp = pentamethylcyclopentadienyl

EXAMPLE 15

In a 500-milliliter reactor were placed 200 ml of heptane, 2 mmol as aluminum atom of the contact product obtained in Example 1 (1), 2 mmol of tirisobutylaluminum, 0.08 mmol of pentamethylcyclopentadienyltitanium trimethoxide and 50 ml of styrene, and poly- (2) Production of Styrene-Based Polymer Polystyrene having syndiotactic configuration was produced in the same manner as in Example 15 except that the contact product obtained in (1) above was used. The results are shown in Table 3.

TABLE 3

| No. | Titanium Compound | Contact[*4] Product (mmol) | Organoaluminum Compound | | Conversion (%) | MIP (%) | Mw ($\times 10^4$) |
|---|---|---|---|---|---|---|---|
| | | | Type | Amount (mmol) | | | |
| Example 15 | Pcp[*1]Ti(OMe)$_3$ | 2 | Al(i-Bu)$_3$ | 2 | 73 | 98 | 85 |
| Example 16 | Pcp[*1]Ti(OMe)$_3$ | 2 | Al(Et)$_3$ | 2 | 64 | 96 | 90 |
| Example 17 | Pcp[*1]Ti(OMe)$_3$ | 2 | Al(OEt)Et$_2$ | 2 | 66 | 97 | 95 |
| Example 18 | Pcp[*1]Ti(OEt)$_3$ | 2 | Al(Et)$_2$Cl | 2 | 54 | 97 | 84 |
| Example 19 | Cp[*2]Ti(OMe)$_3$ | 2 | Al(i-Bu)$_3$ | 2 | 85 | 98 | 30 |
| Example 20 | Ind[*3]Ti(OMe)$_3$ | 2 | Al(i-Bu)$_3$ | 2 | 68 | 98 | 52 |
| Example 21 | Pcp[*1]TiCl(OMe)$_2$ | 2 | Al(i-Bu)$_3$ | 2 | 72 | 98 | 124 |
| Example 22 | Pcp[*1]Ti(OMe)$_3$ | 2 | Al(i-Bu)$_3$ | 2 | 79 | 98 | 88 |

[*1]Pcp = pentamethylcyclopentadienyl
[*2]Cp = cyclopentadienyl
[*3]Ind = indenyl
[*4]Containing methylaluminoxane as a main component.

EXAMPLE 23

(1) Preparation of Contact Product of Aluminum Compound and Water (Component (B))

In a 500-milliliter glass vessel which had been purged with argon were placed 200 ml of toluene, 23.7 g (95 mmol) of copper sulfate pentahydrate (CuSO$_4$.5H$_2$O) and 24 ml (250 mmol) of trimethylaluminum, which were then reacted at 40° C. for 30 hours. Then, solids were removed from the reaction mixture, and volatile components were distilled away from the resulting solution under reduced pressure to obtain 7.04 g of a contact product. The molecular weight of the contact product as determined by the freezing point depression method was 1,100. In the contact product, the high magnetic filed component (i.e., −0.1 to −0.5 ppm) as determined by the $^1$H-NMR method was 30%.

(2) Production of Styrene-Based Polymer

In a 500-milliliter reactor were placed 50 ml of toluene, 10 mmol as aluminum atom of the contact product obtained in (1) above, 0.1 mmol of tetraethoxytitanium and 200 ml of styrene, and polymerization was performed at 50° C. for one hour. After the polymerization, the reaction product was washed with a mixture of hydrochloric acid and methanol to decompose the catalyst components and then dried to obtain 32.7 g of a polymer. This polymer was extracted with methyl ethyl ketone by the use of a Soxhlet extractor to obtain an extraction residue (polymer). The polymer as the extraction residue had a weight average molecular weight of 600,000 and a number average molecular weight of 300,000.

From the melting point and the results of the $^{13}$C-NMR analysis, it was confirmed that the polymer was polystyrene having syndiotacticity in racemi pentad of 98%.

EXAMPLE 24

(1) Preparation of Contact Product of Aluminum Compound and Water (Component (B))

The procedure of Example 23 (1) was repeated with the exception that the reaction temperature and the reaction time were changed to 60° C. and 24 hours, respectively, to obtain 6.5 g of a contact product. The molecular weight of the contact product as determined by the freezing point depression method was 1,900.

In the contact product, the high magnetic field component (i.e., −0.1 to −0.5 ppm) as determined by the $^1$H-NMR analysis was 29%.

(2) Production of Styrene-Based Polymer

The procedure of Example 23 (2) was repeated with the exception that 6 mmol as aluminum atom of the contact product obtained in (1) above was used, 0.06 mmol of pentamethylcyclopentadienyltitanium trimethoxide was used in place of the tetraethoxytitanium, and the reaction temperature was changed to 70° C., to obtain 37.9 g of a polymer. The syndiotacticity in racemi pentad of the polymer as the extraction residue was 97%. The polymer had a weight average molecular weight of 1,800,000 and a number average molecular weight of 900,000.

EXAMPLE 25

In a 500-milliliter reactor were placed 50 ml of toluene, 3 mmol as aluminum atom of the contact product (molecular weight: 1,900) obtained in Example 24 (1), 3 mmol of triisobutylaluminum, 0.06 mmol of pentamethylcyclopentadienyltitanium trimethoxide and 200 ml of styrene, and polymerization was performed at 70° C. for one hour. Thereafter, the same procedure as in Example 23 (2) was conducted to obtain 36.1 g of a polymer. For the polymer as the extraction residue, the syndiotacticity in racemi pentad was 95%, the weight average molecular weight was 800,000, and the number average molecular weight was 400,000.

EXAMPLE 26

In a 500-milliliter reactor were placed 50 ml of toluene, 3 mmol as aluminum atom of the contact product (molecular weight: 1,900) obtained in Example 24 (1), 3 mmol of triisobutylaluminum, 0.06 mmol of pentamethylcyclopentadienyltitanium trimethoxide and 200 ml of styrene, and polymerization was performed at 70° C. for one hour. Thereafter, the same procedure as in Example 23 (2) was conducted to obtain 36.1 g of a polymer. For the polymer as the extraction residue, the syndiotacticity in racemi pentad was 97%, the weight average molecular weight was 400,000, and the number average molecular weight was 200,000.

EXAMPLE 27

In a 500-milliliter reactor were placed 50 ml of toluene, 6 mmol as aluminum atom of the contact product (molecular weight: 1,100) obtained in Example 23 (1), 0.06 mmol of pentamethylcyclopentadienyltitanium trimethyl and 200 ml of styrene, and polymerization was carried out at 70° C. for one hour. Thereafter, the same procedure as in Example 23 (2) was conducted to obtain 48.0 g of a polymer. For the polymer as the extraction residue, the syndiotacticity in racemi pentad was 98%, the weight average molecular weight was 1,200,000, and the number average molecular weight was 600,000.

EXAMPLE 28

(1) Preparation of Contact Product of Aluminum Compound and Water

In a 500-milliliter glass vessel which had been purged with argon were placed 200 ml of toluene, 23.7 g (95 mmol) of copper sulfate pentahydrate, 21.6 ml (225 mmol) of trimethylaluminum and 6.3 ml (25 mmol) of triisobutylaluminum, which were then reacted at 40° C. for 24 hours.

Then, solids were removed from the reaction mixture. The resulting solution was subjected to heat treatment under reduced pressure at 110° C. for 2 hours to obtain 6.12 g of a colorless solid (contact product). The solid was dissolved in 50 ml of toluene to prepare a catalyst solution.

In the contact product, the high magnetic field component (i.e., −0.1 to −0.5 ppm) as determined by the $^1$H-NMR method was 31%.

(2) Polymerization of Styrene

In a 500-milliliter reactor were placed 25 ml of heptane, 6 mmol as aluminum atom of the contact product obtained in (1) above, $12 \times 10^{-3}$ mmol of pentamethylcyclopentadienyltitanium trimethoxide and 225 ml of styrene, and polymerization was carried out at 70° C. for 3 hours.

After the polymerization, the product was washed with a mixture of hydrochloric acid and methanol to decompose the catalyst components and then dried to obtain 48.1 g of a polymer. The polymerization activity was 297 g/g Al. The syndiotacticity in racemi pentad of the polymer as determined by the $^{13}$C-NMR method was 96%.

EXAMPLE 29 TO 31

(1) Preparation of Contact Product of Aluminum Compound and Water

A contact product was prepared in the sam manner as in Example 28 (1) except that the amount of trimethylaluminum was changed, and an aluminum compound in the amount shown in Table 4 was used in place of 6.3 ml (25 mmol) of triisobutylaluminum, and then dissolved in toluene to prepare a catalyst solution.

In the contact products thus obtained, the high magnetic field component (i.e., −0.1 to −0.5 ppm) was 20% in Example 29, 18% in Example 30 and 15% in Example 31.

A polymer (polystyrene) was produced in the same manner as in Example 28 (2) except that the catalyst solution obtained in (1) above was used. The results are shown in Table 4.

TABLE 4

| No. 1 | Trimethyl-aluminum (mmol) | Other Aluminum Compound Type | Amount (mmol) | Yield of Contact Product (g) | Yield of Polymer | Activity (g/g · Al) | Syndiotacticity (%) |
|---|---|---|---|---|---|---|---|
| Example 28 | 225 | Triisobutyl-aluminum | 25 | 6.12 | 48.1 | 297 | 96 |
| Example 29 | 200 | Triisobutyl-aluminum | 50 | 7.09 | 50.8 | 314 | 95 |
| Example 30 | 238 | Triisobutyl-aluminum | 12.5 | 5.97 | 45.0 | 278 | 98 |
| Example 31 | 225 | Tri(2-methylpentyl)aluminum | 25 | 7.62 | 49.3 | 304 | 97 |

EXAMPLE 32

(1) Preparation of Aluminoxane Subjected to Heat Treatment

In a 1,000-milliliter glass vessel which had been purged with argon were placed 74 g (0.30 mol) of copper sulfate pentahydrate (CuSO$_4$.5H$_2$O), 500 ml of toluene and 74 ml (0.78 mol) of trimethylaluminum, which were then reacted at 20° C. for 30 hours. Then, solids were removed from the reaction mixture, and the solution thus obtained was subjected to heat treatment under reduced pressure at 110° C. for 2 hours. As a result, 17.7 g of a colorless glassy contact product (aluminoxane) was obtained.

This contact product was dissolved in 50 ml of toluene to prepare a catalyst component.

In the contact product, the high magnetic field component (i.e., −0.1 to −0.5 ppm) was 39%.

(2) Polymerization of Styrene

In a 500-milliliter reactor were placed 200 ml of heptane, 6 mmol as aluminum atom of the aluminoxane obtained in (1) above, 0.06 mmol of pentamethylcyclopentadienyltitanium trimethoxide and 50 ml of styrene, and polymerization was carried out 70° C. for one hour.

After the polymerization, the product was washed with a mixture of hydrochloric acid and methanol to decompose the catalyst components and then dried to obtain 9.86 g of a polymer (polystyrene). The syndiotacticity in racemi pentad of the polymer as determined by the $^{13}$C-NMR method was 98%.

EXAMPLE 33 TO 35

Catalyst components were obtained in the same manner as in Example 32 (1) except that the heat treatment was performed under conditions shown in Table 5.

Thereafter, a polymer (polystyrene) was obtained in the same manner as in Example 32 (2) except that the above catalyst component was used. The results are shown in Table 5.

TABLE 5

| No. | Heat Treatment Pressure | Temperature (°C.) | Time (hr) | Yield of Aluminoxane (g) | Yield of Polymer (g) | Syndiotacticity (%) |
|---|---|---|---|---|---|---|
| Example 32 | Reduced pressure | 110 | 2 | 17.7 | 9.86 | 98 |
| Example 33 | Reduced pressure | 70 | 2 | 17.8 | 9.27 | 98 |

TABLE 5-continued

| No. | Heat Treatment Pressure | Temperature (°C.) | Time (hr) | Yield of Aluminoxane (g) | Yield of Polymer (g) | Syndiotacticity (%) |
|---|---|---|---|---|---|---|
| Example 34 | Reduced pressure | 50 | 2 | 18.1 | 9.05 | 97 |
| Example 35 | Reduced pressure | 110 | 5 | — | 7.25 | 95 |

What is claimed is:

1. A catalyst for producing styrene-based polymers, comprising (A) a titanium compound and (B) a contact product of a methyl group-containing organoaluminum compound and water, wherein the contact product (B) has a high magnetic field component of not more than 50% in the methyl proton signal region due to an aluminum-methyl group (Al-CH$_3$) bond as determined by the proton nuclear magnetic resonance absorption method.

2. A catalyst for producing styrene-based polymers, comprising (A) a titanium compound, (B) a contact product of a methyl group-containing organoaluminum compound and water, said contact product having a high magnetic field component of not more than 50% in the methyl proton signal region due to an aluminum-methyl group (Al-CH$_3$) bond as determined by the proton nuclear magnetic resonance absorption method, and (C) an organoaluminum compound.

3. The catalyst as claimed in claim 1 wherein the high magnetic component in the methyl proton signal region due to the aluminum-methyl group (Al-CH$_3$ bond as determined by the proton nuclear magnetic resonance absorption method is in the range of −0.1 to −0.5 ppm with the methyl proton (2.35 ppm) of toluene under toluene solvent measuring conditions as the standard.

4. The catalyst as claimed in claim 1 wherein the contact product (B) has a molecular weight of 400 to 3,000 as determined by the freezing point depression method using benzene.

5. The catalyst as claimed in claim 1 wherein the contact product (B) is further subjected to heat treatment at 30° to 200° C.

6. The catalyst as claimed in claim 1 wherein the contact product (B) is a contact product of trimethylaluminum and tribranched alkylaluminum represented by the formula:

AlR$_3$ wherein R is a branched alkyl group having 3 to 10 carbon atoms, with water.

7. The catalyst as claimed in claim 1 wherein the titanium compound (A) is at least one compound selected from the group consisting of titanium compounds and titanium chelate compounds represented by the formula:

$$TiR^1_a R^2_b R^3_c R^4_{4-(a+b+c)} \text{ or}$$

$$TiR^1_d R^2_e R^3_{3-(d+e)}$$

(wherein R$^1$, R$^2$, R$^3$ and R$^4$ are independently a hydrogen atom, an alkyl group having 8 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having 6 to 20 carbon atoms, an acyloxy group having 1 to 20 carbon atoms, a cyclopentadienyl group, a pentamethylcylopentadienyl group, an indenyl group or a halogen atom, a, b and c are independently an integer of 0 to 4, and d and e are independently an integer of 0 to 3.

8. The catalyst as claimed in claim 7 wherein the catalyst comprises (A) a titanium compound, (B) a contact product of a methyl group-containing organoaluminum compound and water, and (c) an organoaluminum compound.

* * * * *